United States Patent
Grussmann et al.

(10) Patent No.: US 8,382,429 B2
(45) Date of Patent: Feb. 26, 2013

(54) TURBINE HOUSING, AND METHOD OF MAKING A TURBINE HOUSING

(75) Inventors: Elmar Grussmann, Altenbeken-Buke (DE); Christian Smatloch, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 751 days.

(21) Appl. No.: 12/603,007

(22) Filed: Oct. 21, 2009

(65) Prior Publication Data

US 2010/0098533 A1    Apr. 22, 2010

(30) Foreign Application Priority Data

Oct. 21, 2008  (DE) ................ 10 2008 052 552

(51) Int. Cl.
*F01D 25/28* (2006.01)
(52) U.S. Cl. ............. 415/213.1; 415/26; 415/214.1; 415/211.2
(58) Field of Classification Search ............ 415/206, 415/213.1, 214.1, 211.2
See application file for complete search history.

(56) References Cited

U.S. PATENT DOCUMENTS

| | | | |
|---|---|---|---|
| 3,965,681 A * | 6/1976 | Wyczalek et al. | 60/599 |
| 7,198,459 B2 | 4/2007 | Grussmann et al. | |
| 2008/0118762 A1* | 5/2008 | Morimoto et al. | 428/457 |

FOREIGN PATENT DOCUMENTS

| | | |
|---|---|---|
| DE | 100 22 052 A1 | 3/2001 |
| DE | 103 52 960 A1 | 8/2005 |
| EP | 1 925 784 A1 | 5/2008 |
| WO | WO 02/29211 | 4/2002 |
| WO | WO 2005/042927 | 5/2005 |

* cited by examiner

*Primary Examiner* — Ninh H Nguyen
(74) *Attorney, Agent, or Firm* — Henry M. Feiereisen LLC

(57) ABSTRACT

A turbine housing of an exhaust gas turbocharger includes an outer casing and a rotor casing which is arranged in the outer casing and includes a tubular neck for engagement in an exhaust pipe to conduct exhaust gas from the neck in a direction of an exhaust flange. The exhaust pipe is hereby coupled to the rotor casing for relative movement there between. A sealing ring is arranged between the neck and the exhaust pipe, wherein the neck has one end provided with at least one outwardly directed projection defined by an outer diameter which is greater than an inner diameter of the sealing ring. Fabrication of the turbine housing is realized by pushing the sealing ring over the neck, and inserting an expanding mandrel into the neck to widen the neck.

22 Claims, 2 Drawing Sheets

US 8,382,429 B2

TURBINE HOUSING, AND METHOD OF MAKING A TURBINE HOUSING

CROSS-REFERENCES TO RELATED APPLICATIONS

This application claims the priority of German Patent Application, Serial No. 10 2008 052 552.9, filed Oct. 21, 2008, pursuant to 35 U.S.C. 119(a)-(d), the content of which is incorporated herein by reference in its entirety as if fully set forth herein.

BACKGROUND OF THE INVENTION

The present invention relates to a turbine housing, and to a method of making a turbine housing.

The following discussion of related art is provided to assist the reader in understanding the advantages of the invention, and is not to be construed as an admission that this related art is prior art to this invention.

Internal combustion engines for motor vehicles are increasingly charged by turbochargers to reduce fuel consumption. However, fuel consumption is also impacted by the weight of the exhaust system so that turbochargers should have a lowest possible weight. On the other hand, turbochargers should also be robust enough to withstand significant mechanical and in particular high thermal stress during operation to which they are subjected. Still another consideration is the increasingly smaller installation space that is available in the engine compartment because of the increasing number of aggregates.

Various approaches have been suggested to find a compromise between lightweight construction of the turbochargers and desired service life. The service life of a turbocharger is particularly impacted by thermally induced stress. Therefore, the presence of thermal compensating elements has been proposed. This poses, however, a sealing problem. To address this problem, German Offenlegungsschrift DE 100 22 052 A1 proposes to decouple exhaust gas conducting components from supporting and sealing outer structures. While the internal system can hereby be tightly connected to the external system, thermal stress causes a deformation of the components so that there is a risk of collision of the internal system or rotor casing with the turbine rotor.

The internal system has to meet certain tightness requirements to ensure an efficient operation of the turbocharger. German Offenlegungsschrift DE 103 52 960 A1 describes the presence of a sliding seat to prevent thermal stress between a rotor casing and an overflow zone which conducts the exhaust to an exhaust flange. While elongation is compensated hereby, the presence of thermomechanical stress still undermines an economical production of the housing because of the necessarily required material properties and manufacturing tolerances necessary for a reliable operation.

It would therefore be desirable and advantageous to obviate prior art shortcomings and to realize maximum sealing effect of the internal system while allowing compensation of a temperature-caused elongation between the rotor casing and an exhaust pipe for the exhaust and use of thin-walled materials without the need for any welding works in the sensitive exhaust zone of the rotor casing.

SUMMARY OF THE INVENTION

According to one aspect of the present invention, a method of making a turbine housing of an exhaust gas turbocharger, with the turbine housing having an outer casing and a rotor casing arranged in the outer casing and including a tubular neck for engagement in an exhaust pipe for conducting exhaust gas from the rotor casing in a direction of an exhaust flange, with the exhaust pipe being coupled to the rotor casing for relative movement there between, includes the steps of connecting a metallic sealing ring to the exhaust pipe, pushing the sealing ring arranged on the exhaust pipe over the neck, and inserting an expanding mandrel into the neck to widen the neck.

According to another aspect of the present invention, a turbine housing of an exhaust gas turbocharger includes an outer casing, a rotor casing arranged in the outer casing and including a tubular neck for engagement in an exhaust pipe to conduct exhaust gas from the neck in a direction of an exhaust flange, wherein the exhaust pipe is coupled to the rotor casing for relative movement there between, and a sealing ring arranged between the neck and the exhaust pipe, wherein the neck has one end provided with at least one outwardly directed projection defined by an outer diameter which is greater than an inner diameter of the sealing ring.

As a result of the present invention, slightly greater manufacturing tolerances can advantageously be selected for the sealing ring and the neck because the wanted sealing effect between the neck and the exhaust pipe can be subsequently established through adjustment of a sealing gap by the expanding mandrel. The expanding mandrel widens the neck until the neck bears against the sealing ring. In other words, the neck is pressed against the sealing ring by a defined force, while allowing the neck to spring back after removal of the expanding mandrel. As a result, a defined gap width can be established between the sealing ring and an outer side of the neck. The sealing ring is firmly connected with the exhaust pipe while still being movable in relation to the neck, after the neck has been widened by the expanding mandrel. It is thus possible to manufacture the internal structure, i.e. rotor casing and neck for engagement in the exhaust pipe for conducting exhaust gas from the rotor casing in the direction of the exhaust flange, from thin-walled steel materials. The internal structure involves sheet metal parts that can have a wall thickness of $\leq 1.00$ mm. As a result of the thin-walled internal structure, energy loss is small during the warming-up phase of the engine. An unwanted cool down of the exhaust gas is prevented so that the emission behavior of the overall system is improved when a downstream catalytic converter starts up.

Although the provision of a (metallic) sealing ring of sufficient resistance force and mass is required and thus adds weight, this added weight can, however, be compensated by making the internal structure of thin-walled material. This applies to the exhaust pipe as well as to the rotor casing.

According to another advantageous feature of the present invention, the sealing ring may be connected to the exhaust pipe by material union or interference fit.

According to still another advantageous feature of the present invention, the sealing ring may be made in one piece with the exhaust pipe and formed by turning an end of the exhaust pipe.

The formation of the projection may be provided in a single spot. Currently preferred is however the provision of two or more projections. Suitably, the projections are evenly spaced form one another about the circumference of the neck. Of course, the projection may also be configured in the form of a circumferential collar. The projection assumes the task to prevent a sliding off of the sealing ring from the neck. This task is attained when the outer diameter of the projection exceeds the inner diameter of the sealing ring. This can already be realized with projections that are small as a consequence of the relatively small gap width between the outer side of the neck and the inner side of the sealing ring. The projection or outward deflection may have a funnel-shaped configuration defined by an angle in a range of 10° to 100° in relation to a longitudinal center axis of the neck. Currently preferred is an angle in a range of 30° to 90° in relation to a longitudinal center axis of the neck.

The sealing ring is placed over the neck before formation of the projection, when the neck is formed in one piece with the rotor casing having areas of greater diameter. The rotor casing may be formed of two interconnected shells.

In order to ensure a defined disposition of the sealing ring during widening of the neck, an installation aid in the form of a fitting ring may be arranged on the neck on a projection-distal side of the sealing ring. The provision of the fitting ring fixates the disposition of the sealing ring in axial direction. The fitting ring may hereby be supported by the areas of the rotor casing that are greater in diameter and is thus configured with an inner cross sectional contour which conforms to the outer contour of the rotor casing in the transition zone to the neck. The sealing ring is supported in axial direction on the fitting ring so that the widening force applied by the expanding mandrel is absorbed by the precisely positioned sealing ring.

According to another advantageous feature of the present invention, the fitting ring may be made of plastic. During initial operation of the turbocharger, the fitting ring melts and thus has no adverse effect on the overall mass of the turbocharger housing and does also not interfere with relative movement of the sealing in relation to the neck.

The sealing ring may be a machinable component with a roundness which together with the widening process implemented by the expanding mandrel establishes a precise centering of the sealing ring in relation to the neck. The sealing ring may be made of metal and connected to the exhaust pipe by material union or interference fit. Joining of the sealing ring with the exhaust pipe is implemented before the sealing ring is placed over the neck. As a result, there is no need for welding operations in the assembled state in the sensitive exhaust zone of the internal system. In other words, there is no distortion due to welding of the internal system and there is no spattering as a result of welding.

According to another advantageous feature of the present invention, the sealing ring may be made in one piece with the exhaust pipe and formed by turning an end of the exhaust pipe. In other words, the end of the exhaust pipe may be turned inwards. This type of material doubling forms the area of the sealing ring, with only the inner "layer" of the material doubling contacting the neck. This material doubling is necessary to provide sufficient resistance when the neck is widened by the expanding mandrel and to realize the desired width of the sealing gap.

According to another advantageous feature of the present invention, the exhaust pipe may have a length portion configured in the form of a bellows.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
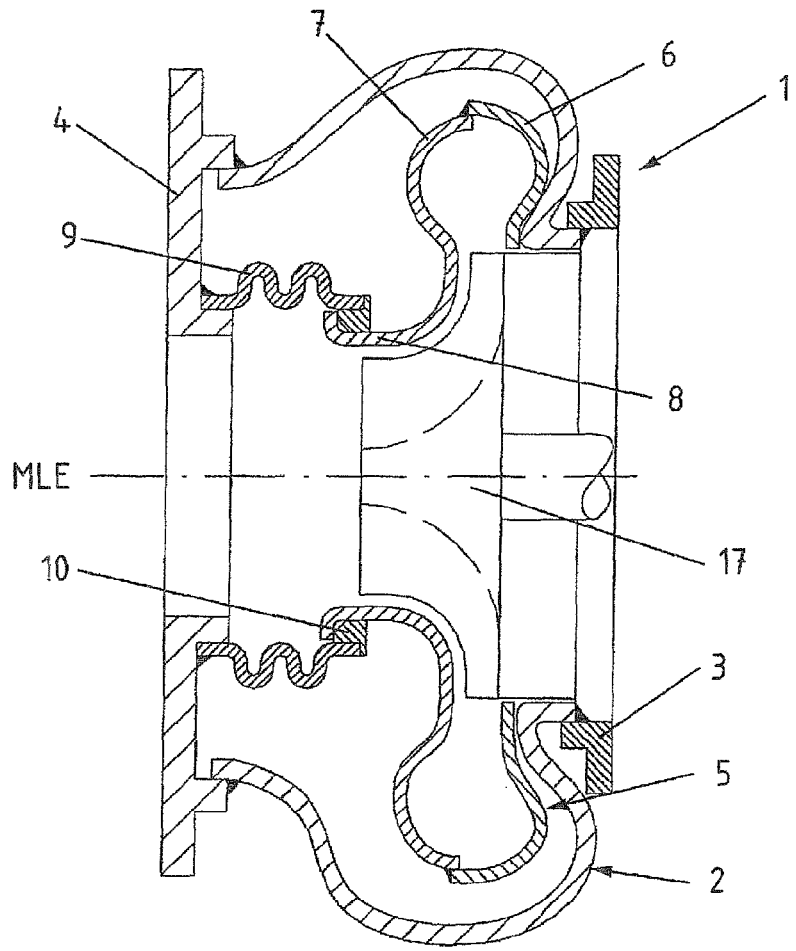
FIG. 1 is a cross section of a turbine housing according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross section of a turbine housing according to the present invention, generally designated by reference numeral 1 and forming part of an exhaust turbocharger. The turbine housing 1 includes an outer casing 2 sized to extend from a housing flange 3 to an exhaust flange 4. The outer casing 2 is welded to the housing flange 3 and to the exhaust flange 4 and bounds a gastight interior space. A rotor casing 5 is situated within the outer casing 2 and is formed of two sheet metal shells 6, 7 which are welded together on the outer circumference of the rotor casing 5. The sheet metal shell 7 on the left-hand side of the drawing plane includes a tubular neck 8 which extends in a direction of the exhaust flange 4. A turbine rotor 17 projects up to the neck 8 which has a contour conforming to the outer contour of the turbine rotor 17. The neck 8 conducts exhaust exiting the rotor casing 5 via the exhaust pipe 9 in the form of a bellows to the exhaust flange 4 via which the exhaust gas is carried off. The exhaust pipe 9 is welded gastight with the exhaust flange 4. At its end distal to the exhaust flange 4, the exhaust pipe 9 has arranged thereon a sealing ring 10 which embraces the outside of the neck 8.

Figure 2:
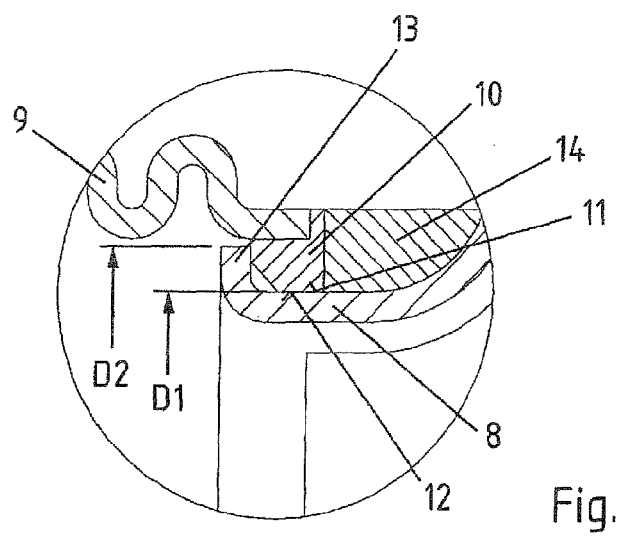
FIG. 2 is an enlarged detailed view of a sealing zone of the turbine housing of FIG. 1 with installed fitting ring.

FIG. 2 shows the sealing ring 10 on an enlarged scale. The sealing ring 10 is connected to the stub-like end of the exhaust pipe 9 in a manner not shown in detail. Suitably, the sealing ring 10 is welded or compressed with the exhaust pipe 9. The sealing ring 10 has an inner diameter D1 which conforms to the outer diameter of the cylindrically configured neck 8. The sealing ring 10 is axially movable in relation to the neck 8 in axial direction, i.e. in the direction of the longitudinal center axis MLE of the neck 8. A sealing gap defined between the outer side 11 of the neck 8 and the inner side 12 of the sealing ring 10 is very small because the neck 8 has been widened in circumferential direction by an expanding mandrel (not shown) that has been inserted into the neck 8. As a result, the neck 8 is pressed against the inner side 12 of the sealing ring 10. The defined force for widening the neck 8 is hereby selected to allow the neck 8 to slightly spring back after the expanding mandrel has been withdrawn so that the desired width of the sealing gap is realized without causing a seizing between the sealing ring 10 and the neck 8.

The neck 8 has an end which is provided with an outwardly directed projection 13 defined by an outer diameter D2 which is greater than the inner diameter D1 of the neck 8. In the non-limiting example of FIGS. 1 and 2, the projection 13 is configured in the form of a circumferential collar which is angled by 90° in relation to the longitudinal center pane MLE.

As can be further seen from FIG. 2, a fitting ring 14 is arranged on the projection-distal side of the sealing ring 10. The fitting ring 14 has an inner contour which matches the outer contour of the neck 8 or sheet metal shell 7 to prevent the sealing ring 10 to move too far on the neck 8. The positional orientation or securement of the sealing ring 10 during installation is important to enable the expanding mandrel to effectively transmit the widening force onto the sealing ring 10. The fitting ring 14 has an outer diameter which is the same as the outer diameter of the sealing ring 10 and is made of a plastic that melts when the turbocharger is starts up.

Figure 3:
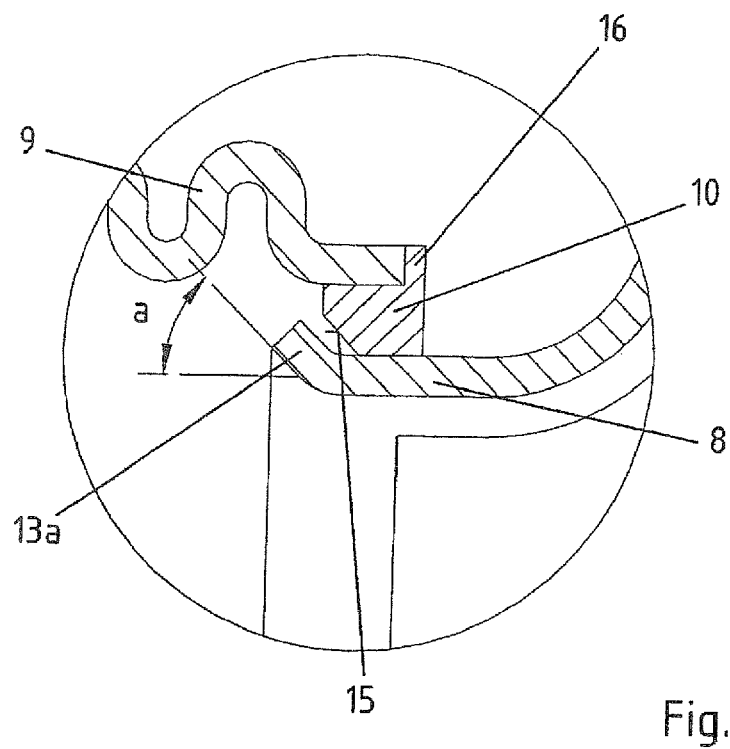
FIG. 3 is an enlarged detailed view of a modification of the sealing zone of the turbine housing.

Referring now to FIG. 3, there is shown an enlarged detailed view of a modification of the sealing zone between the sealing ring 10 and the neck 8 of the turbine housing 1. Parts corresponding with those in FIG. 2 are denoted by identical reference numerals and not explained again. The description below will center on the differences between the embodiments. In this embodiment, the end of the neck 8 is outwardly turned at an angle a of less than 90° to define a projection 13a and to save even more installation space. By way of example, FIG. 3 shows an angle a of about 45°. The outer diameter D2 of the projection 13a is still sufficiently sized to prevent the sealing ring 10 from sliding off the neck 8. Moreover, the sealing ring 10 may be placed closer to the end of the neck 8 as the sealing ring 10 has in confronting relationship to the end of the neck 8 a bevel 15 of an inclination to complement the angle a of the projection 13a. In other words, in the non-limiting example of FIG. 3, also the bevel 15 is inclined at an angle of about 45° in relation to the inner side 12 of the sealing ring 10.

The sealing ring 10 has a thickness, as measured in radial direction, which thickness is twice the wall thickness of the neck 8 or exhaust pipe 9. In the non-limiting example of FIGS. 1, 2, 3, the sealing ring 10 has an end face which extends slightly beyond the exhaust pipe 9 and forms a collar 16 which bears upon the end face of the exhaust pipe 9. The collar 16 extends flush with the end portion of the exhaust pipe 9 in surrounding relationship to the neck 8.

The outer diameter of the exhaust pipe 9 is greater than the outer diameter of the neck 8 because the exhaust pipe 9 has a mid-portion configured as bellows. In the attachment zone with the sealing ring 10 and the exhaust flange 4, the exhaust pipe 9 has respective circular cylindrical portions which are not corrugated to enable an attachment to the exhaust flange 4 and the sealing ring 10, respectively.

Figure 4:
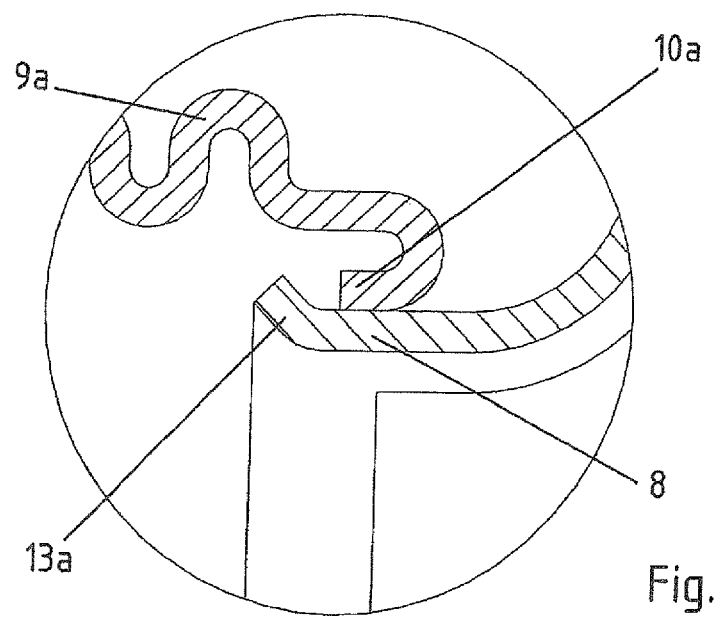
FIG. 4 is an enlarged detailed view of yet another modification of the sealing zone of the turbine housing.

FIG. 4 shows another modification of the sealing zone, in which a sealing ring is formed in one piece with the exhaust pipe 9a and realized by inwardly turning an end of the exhaust pipe 9 to form a double-layered region 10. In other words, this double-layered region 10a of the exhaust pipe 9a thus assumes the function of the sealing ring or represents the sealing ring. In this way, the number of components can be further reduced without adversely affecting the sealing action between the exhaust pipe 9a and the neck 8. Also in this variation, the neck 8 is widened in a manner not shown in detail by an expanding mandrel and pressed against the sealing ring 10a of the exhaust pipe 9a. As described above, a projection 13a is formed in the shape of a circumferential collar.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of making a turbine housing of an exhaust gas turbocharger, said turbine housing having an outer casing and a rotor casing arranged in the outer casing and including a tubular neck for engagement in an exhaust pipe for conducting exhaust gas from the rotor casing in a direction of an exhaust flange, with the exhaust pipe coupled to the rotor casing for relative movement there between, said method comprising the steps of:
    connecting a metallic sealing ring to the exhaust pipe;
    pushing the sealing ring arranged on the exhaust pipe over the neck; and
    inserting an expanding mandrel into the neck to widen the neck.

2. The method of claim 1, further comprising the steps of pressing the neck against the sealing ring by a defined force, and allowing the neck to spring back after removal of the expanding mandrel to establish a defined gap width between the sealing ring and an outer side of the neck.

3. The method of claim 1, further comprising the steps of outwardly turning at least some areas of an end of the neck to form at least one projection defined by an outer diameter which is greater than an inner diameter of the sealing ring.

4. The method of claim 3, wherein the projection has a funnel-shaped configuration defined by an angle in a range of 10° to 100° in relation to a longitudinal center axis of the neck.

5. The method of claim 3, wherein the projection has a funnel-shaped configuration defined by an angle in a range of 30° to 90° in relation to a longitudinal center axis of the neck.

6. The method of claim 3, wherein at least two of said projection are formed.

7. The method of claim 1, further comprising the step of placing a fitting ring onto the neck to secure a position of the sealing ring in an axial direction.

8. The method of claim 7, wherein the fitting ring is made of a plastic that melts when the turbocharger starts up.

9. The method of claim 1, wherein the sealing ring is connected to the exhaust pipe by material union or interference fit.

10. The method of claim 1, wherein the sealing ring is made in one piece with the exhaust pipe and formed by turning an end of the exhaust pipe.

11. A turbine housing of an exhaust gas turbocharger, comprising:
    an outer casing;
    a rotor casing arranged in the outer casing and including a tubular neck for engagement in an exhaust pipe to conduct exhaust gas from the neck in a direction of an exhaust flange, wherein the exhaust pipe is coupled to the rotor casing for relative movement there between; and
    a sealing ring arranged between the neck and the exhaust pipe,
    wherein the neck has one end provided with at least one outwardly directed projection defined by an outer diameter which is greater than an inner diameter of the sealing ring.

12. The turbine housing of claim 11, wherein the projection has a funnel-shaped configuration defined by an angle in a range of 10° to 100° in relation to a longitudinal center axis of the neck.

13. The turbine housing of claim 11, wherein the projection has a funnel-shaped configuration defined by an angle in a range of 30° to 90° in relation to a longitudinal center axis of the neck.

14. The turbine housing of claim 11, further comprising at least two of said projection in circumferential spaced-apart relationship.

15. The turbine housing of claim 11, wherein the projection is a circumferential collar.

16. The turbine housing of claim 11, further comprising a fitting ring arranged on the neck on a projection-distal side of the sealing ring.

17. The turbine housing of claim 16, wherein the fitting ring is made of plastic.

18. The turbine housing of claim 11, wherein the sealing ring is made of metal and connected to the exhaust pipe by material union or interference fit.

19. The turbine housing of claim 11, wherein the sealing ring is made in one piece with the exhaust pipe and formed by turning an end of the exhaust pipe.

20. The turbine housing of claim 11, wherein the exhaust pipe has a length portion configured in the form of a bellows.

21. The turbine housing of claim 11, wherein the sealing ring has in confronting relationship to a proximal end of the neck a bevel which is defined by an inclination to complement an angled configuration of the projection.

22. The turbine housing of claim 11, wherein the sealing ring has a collar which projects outwards to bear upon a confronting end face of the exhaust pipe.

* * * * *